United States Patent [19]

Cothenet

[11] Patent Number: 4,981,287
[45] Date of Patent: Jan. 1, 1991

[54] UPPER ARTICULATED CONNECTING DEVICE BETWEEN A SPRING-SHOCK ABSORBER ASSEMBLY AND THE CHASSIS OF A MOTOR VEHICLE

[75] Inventor: Didier Cothenet, Bonneval, France
[73] Assignee: Hutchinson, France
[21] Appl. No.: 380,319
[22] Filed: Jul. 17, 1989
[30] Foreign Application Priority Data
 Jul. 20, 1988 [FR] France ............................. 88 09821
[51] Int. Cl.⁵ .................... B60G 15/06; F16F 15/08
[52] U.S. Cl. .................................. 267/292; 267/220;
 267/153; 280/668
[58] Field of Search ............... 267/292, 293, 294, 153,
 267/140.3, 140.4, 35, 33, 220, 219; 280/668,
 671, 692, 716; 188/321.11

[56] References Cited

U.S. PATENT DOCUMENTS

| 4,084,837 | 4/1978 | Milner | 280/668 |
| 4,298,193 | 11/1981 | Mourray | 267/220 |
| 4,332,397 | 6/1982 | Steger | 267/220 X |
| 4,434,977 | 3/1984 | Chiba et al. | 267/220 X |
| 4,465,296 | 8/1984 | Shiratori et al. | |
| 4,477,061 | 10/1984 | Kawaura et al. | 267/220 |
| 4,478,396 | 10/1984 | Kawaura | 267/220 |
| 4,486,028 | 12/1984 | Tanahashi | |
| 4,618,127 | 10/1986 | LeSalver et al. | 267/220 |
| 4,618,130 | 10/1986 | Veglia | 267/220 X |
| 4,673,192 | 6/1987 | Krehan et al. | |
| 4,756,517 | 7/1988 | Kakimoto | 280/668 X |
| 4,779,855 | 10/1988 | Tanaka | 280/668 X |
| 4,798,370 | 1/1989 | Inuzuka | 280/668 X |

FOREIGN PATENT DOCUMENTS

0063016 10/1982 European Pat. Off. .
0160276 11/1985 European Pat. Off. .
0268393 5/1988 European Pat. Off. .
2364777 4/1978 France .
2536135 5/1984 France .

OTHER PUBLICATIONS

Patent Abstracts of Japan, vol. 11, No. 397 (M-655) [2844], 25 Dec. 1987; & JP-A-62 163 811 (Tyoyota Motor Corp.) 20-07-1987.
Patent Abstracts of Japan, vol. 12, No. 18 (M-660) [2865], 20 Jan. 1988; & JP-A-52 178 410 (Nissan Motor Co., Ltd.) 05-08-1987.
Patent Abstracts of Japan, vol. 7, No. 29 (M-191) [1174], 5 Feb. 1983; & JP-A-57 182 503 (Kinugawa Gomu Kogyo K. K.) 10-11-1982.

*Primary Examiner*—Douglas C. Butler
*Attorney, Agent, or Firm*—Larson and Taylor

[57] ABSTRACT

An upper articulated connecting device for connection between a spring-shock absorber assembly and the chassis of a motor vehicle, comprising: a frame (b 1,2,3) having a connecting piece (3) for securing the upper end of the shock absorber and girdled by a swivel joint (4); a frame (5) having on its lower face a lining (6) supporting the suspension spring and closed at the top by a cover (8); a low rigidity ring (11), secured between the lower portion of the swivel joint (4) and an annular bearing surface (13) integral with the frame (5); a high rigidity girdle whose external peripheral surface extends at a short distance from the internal peripheral surface of the cover, this girdle having two axial abutment surfaces, one adapted to bear against the bottom of the cover, and the other against a peripheral flange of the annular bearing surface.

5 Claims, 2 Drawing Sheets

UPPER ARTICULATED CONNECTING DEVICE BETWEEN A SPRING-SHOCK ABSORBER ASSEMBLY AND THE CHASSIS OF A MOTOR VEHICLE

The present invention relates to an upper articulated connecting device between a spring-shock absorber assembly and the chassis of a motor vehicle. It is a device intended in particular for steering wheel trains, and of the two stage type, namely a low rigidity so-called "filtering" stage and a high rigidity stage for limiting the free movements.

One of the aims of the present invention is to obtain, for small movements about the articulation point, a low axial rigidity in both directions (compression or extension of the spring-shock absorber assembly), and low radial rigidity; and for large movements (beyond a predetermined threshold), high axial rigidity also in both directions, as well as high radial rigidity.

For conic movements beyond a threshold which is also predetermined, the rigidity must be high in one direction and low in the direction perpendicular to the preceding one, even for large angular movements of the shock absorber. As a general rule, the high conic rigidity will be obtained in the transverse direction of the vehicle and the low rigidity consequently in the longitudinal direction thereof.

Thus, it can be seen that the invention relates to an articulated connecting device whose purpose is to integrate several fairly diverse functions in the same member.

It will further be advisable to obtain good decoupling between the low rigidities about the articulation point and the high rigidities for the large movements.

According to the present invention, these functions, as well as others which will be seen subsequently, are obtained by a device of the above described type and characterized in that it comprises:

a central internal frame having a means for securing the upper end of the shock absorber and surrounded by a swivel joint;

an external frame carrying on its lower face a lining for supporting the suspension spring and closed at the top by a cover;

a low rigidity ring, secured between the lower portion of said swivel joint and an annular bearing surface integral with said external frame; and a high rigidity girdle whose external peripheral surface extends at a short distance from the internal peripheral surface of said cover, this girdle having two axial abutment surfaces, one adapted to bear against the bottom of said cover, the other against a peripheral flange of said annular bearing surface.

With these arrangements, it will be readily understood that the low rigidities in the directions mentioned above will be obtained through the low rigidity ring which is fixed between the lower portion of the swivel joint and the annular bearing surface integral with the external frame.

Beyond a certain fixed threshold for the axial movements in both directions, moreover, the high rigidity will be provided by the axial abutment surfaces, the high compression rigidity being provided from the moment when the upper surface of the girdle abuts against the bottom of the cover, and the high rigidity in the extension or rebound direction being provided beyond a predetermined movement from the moment when the lower surface of said girdle abuts against the peripheral flange of the annular bearing surface which is integral with the external frame.

Other advantages and functions of the present invention, particularly the fact of obtaining a high conic rigidity in one direction, beyond a predetermined movement, and low conic rigidity in the direction perpendicular to the preceding one, even for large movements, will be clearer from the embodiment which will now be described with reference to the figures of the accompanying drawings in which.

Figure 1:
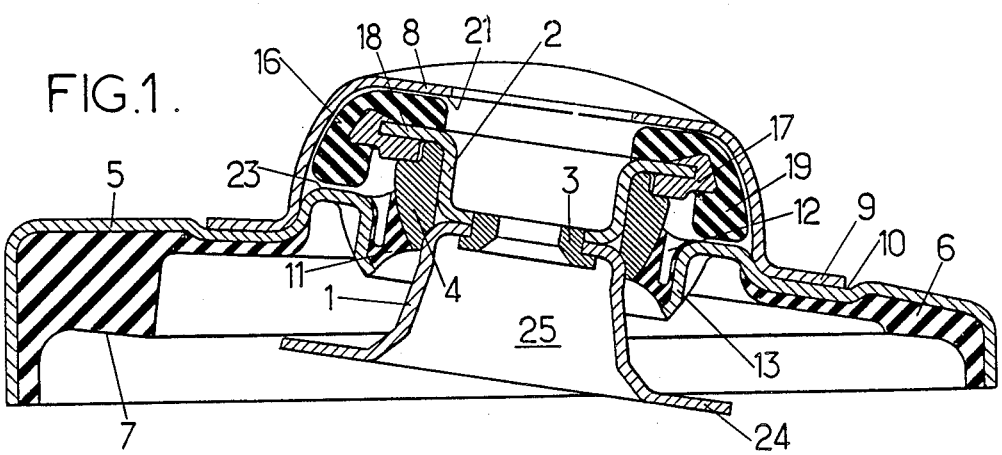
FIG. 1 is an axial sectional view of an upper articulated connecting device according to the invention, in a direction transverse to the axis of the vehicle, the spring and the shock absorber not being shown.

In the different Figures, two opposite cups have been shown at 1 and 2 joined together by their bottoms through a connecting piece 3 and forming together what has been referred to as the central internal frame, said connecting piece 3 also forming the means for securing the upper end of the shock absorber (not shown). The central internal frame 1, 2, 3 thus formed is girdled by a swivel joint 4 which may be made from light alloy or plastic material, whereas cups 1 and 2 forming the central frame may be made from steel plate. In accordance with an important arrangement of the invention, the securing device 3 is situated at a lower level than the centre of rotation of said swivel joint 4. The position of this centre which is (theoretically) the one about which the shock absorber in actual fact is articulated, makes it possible to confer on the latter a greater fictitious length than its actual length, which results in improving the kinematics of the undercarriage.

The device further comprises, as mentioned above, an external frame referenced at 5 which may also be made from steel plate, which is in the form of a cup open downwards and which comprises on the inside a rubber or elastomer material lining 6 against which the suspension spring (not shown either) bears. The bearing surface for this spring is referenced at 7. This external frame 5 is completed at the top and closed by a cover 8, also made from steel plate or possibly from a rigid plastic material, and fixed by its external edge 9 to the external frame 5, for example by welding this edge to the bottom of a peripheral groove 10 which this latter frame comprises.

A low rigidity ring 11, which may also be made from elastomer and which may comprise a peripheral groove 12, is bonded between the lower portion of swivel joint 4 and an annular bearing surface 13 integral with the external frame 5. As can be seen in the drawings, this annular bearing surface 13 is formed by a cylindrical well forming a central opening in frame 5. It will be clear that it is the presence at this position of the low rigidity ring 11 which will permit, within well defined movement limits, the low rigidity articulated connection between the spring-shock absorber assembly and the chassis of the motor vehicle, to which the external frame 5 will be fixed.

This ring 11 also serves as seal protecting the high rigidity upper portion of the device against any pollution which may come from the undercarriage and which might lead to a reduction of the functional play.

Figure 2:
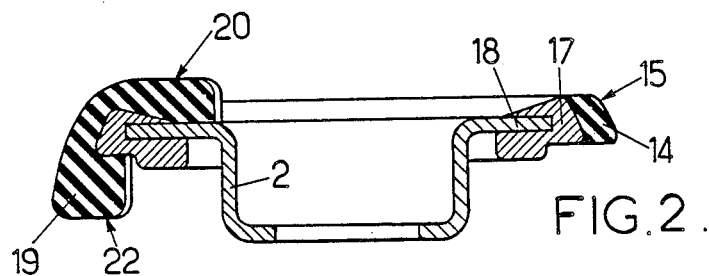
FIG. 2 is a double partial view of the upper portion of the device, in axial sections through two perpendicular planes defined by lines 2—2 of FIG. 3.
Figure 5:
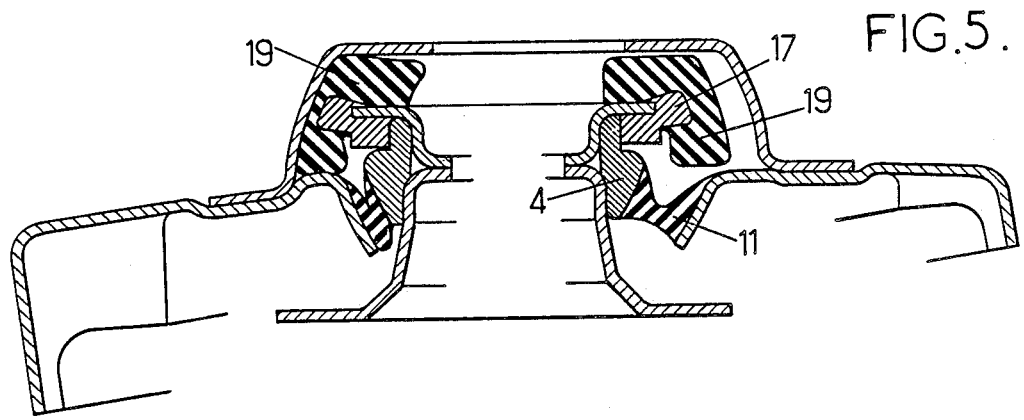
FIG. 5 is a more schematic view similar to that of FIG. 4 and showing radial movement leftwards, bringing the periphery of the high rigidity girdle in abutment against the internal peripheral surface of the cover.

To ensure the high rigidity of this articulated connection and abutment when the low rigidity movements are exceeded, the device further comprises essentially a high rigidity rubber encircling member 14 (see for example FIGS. 2 and 3) whose external peripheral surface 15 extends at a short distance from the internal peripheral surface 16 of cover 8, which provides the high radial rigidity for large movements (see the left-hand part of FIG. 5). This encircling member 14 is secured by any appropriate means to a plastic material (or light alloy) coating mass 17 which is moulded over a peripheral flange 18 forming part of the upper cup 2 of the central internal frame. The shape of this coating mass is determined as a function of the rigidity characteristics defined by the specifications.

As mentioned above, encircling member 14 has two axial abutment surfaces, one adapted to bear against the bottom 21 of said cover, the other on a peripheral flange 23 of said annular bearing surface 13. These surfaces are carried by two raised projection 19 diametrically opposed in the transverse plane of the vehicle, as can be seen particularly in FIGS. 1 and 3, and which form an integral part of encircling member 14. These two raised projection 19 project axially on each side of the remaining portion of this encircling member 14. Their upper surface 20 thus forms one of the axial abutment surfaces, adapted to bear against the bottom 21 of cover 8 when the compression movement (shock) of the spring-shock absorber assembly has exceeded the predetermined value (see left-hand part of FIG. 4).

Similarly, the raised projection 19 further has a lower axial abutment surface 22, which is adapted to bear against a peripheral flange 23 forming part of said annular bearing surface 13. Such abutment makes it possible to obtain high rigidity on rebound, i.e. when the extension of the spring-shock absorber assembly exceeds the predetermined amplitude (see right-hand part of FIG. 4).

Figure 3:
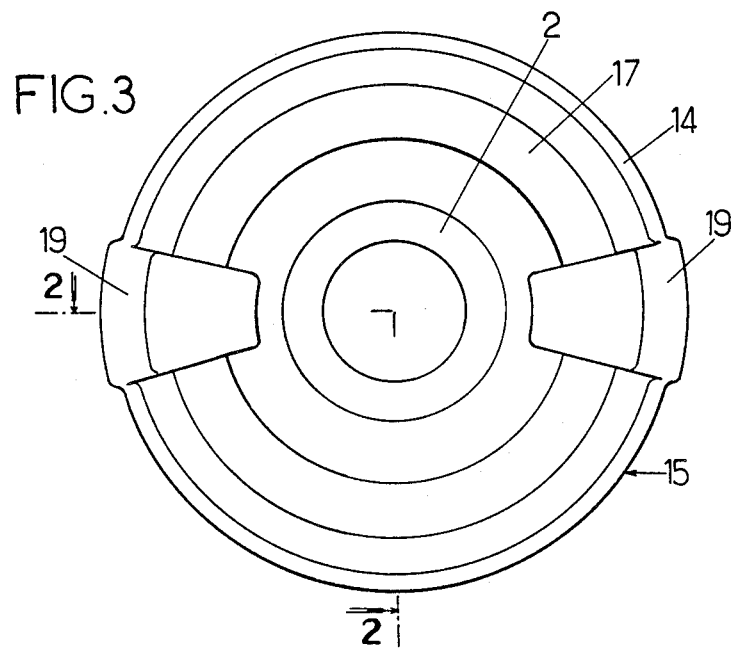
FIG. 3 is a top view of the upper portion shown in FIG. 2.
Figure 4:
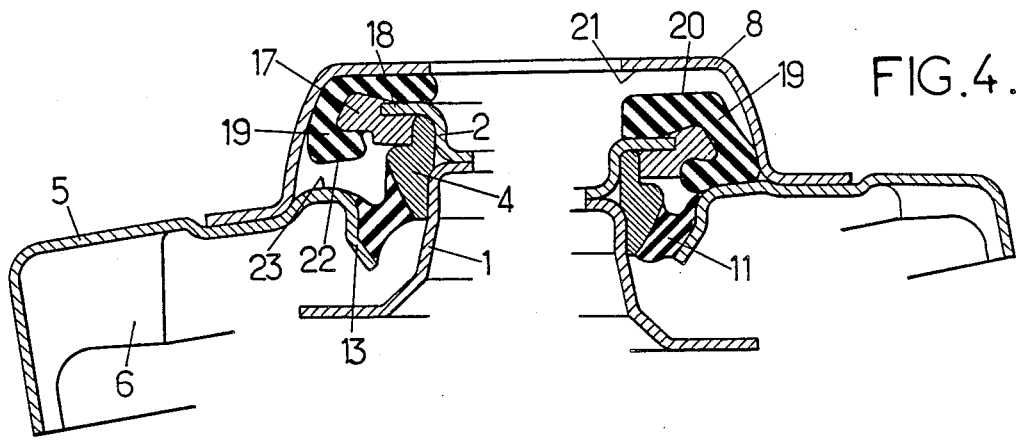
FIG. 4 is a more schematic axial and cross sectional view of the device of the preceding Figures, the right-hand half of the Figure showing axial abutment on rebound (in extension) and the left-hand portion showing axial abutment at the time of a shock (in compression)
Figure 6:
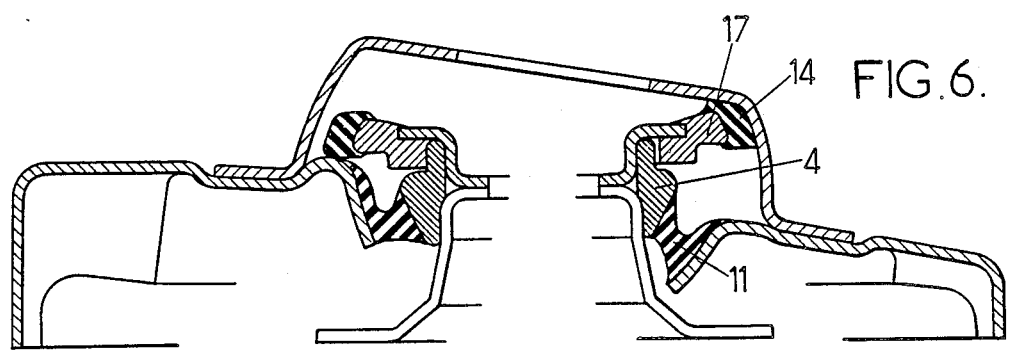
FIG. 6 is a schematic longitudinal sectional view of the device of the invention, showing the conservation of low conic rigidity for high angular movements in a longitudinal plane.

These two diametrically opposite raised projection 19 have a low angular amplitude, as can be seen in FIG. 3, which makes it possible to confer thereon additionally the role of providing high rigidity for the conic movements beyond a given angular amplitude in the transverse plane, while keeping a very low angular rigidity for the device in the plane perpendicular to the preceding one, namely the longitudinal plane which is that of FIG. 6.

Such being the case, it will be readily understood that it is the play between surfaces 15–16, 20–21 and 22–23 which will determine the decoupling point between the "low rigidity" and "high rigidity" functions of the device which has just been described.

Finally, it should be noted that the lower cup 1 makes it possible to provide the functions of "shock abutment surface" (24), "housing the shock absorber bellows" (25) and "safety stopping of the shock absorber", in the case of destruction of the shock abutment.

I claim:

1. Upper articulated connecting device between a spring-shock absorber assembly and the chassis of a motor vehicle, which comprises:

a central internal frame (1,2,3) having a means (3) for securing the upper end of the shock absorber and surrounded by a swivel joint (4);

an external frame (5) carrying on its lower face a lining (6) on which a suspension spring bears and which is closed at the top by a cover (8);

a low rigidity ring (11), secured between a lower portion of said swivel joint (4) and an annular bearing surface (13) integral with said external frame (5); and a high rigidity encircling member (14) whose external peripheral surface (15) extends at a short distance from the internal peripheral surface (16) of said cover (8), this encircling ember (14) having two axial abutment surfaces (20,22), one adapted to bear against the bottom (21) of said cover, the other against a peripheral flange (23) of said annular bearing surface (13).

2. Device according to claim 1, characterized in that said central internal frame is formed of two cups (1,2) joined together at their bottoms by a connecting piece (3) also forming said means for securing the upper end of the shock absorber, and in that said securing means (3) is situated at a level lower than that of the center of rotation of said swivel joint (4).

3. Device according to claim 2, characterized in that the upper cup (2) of said central internal frame (1,2) comprises a peripheral flange (18) adapted for fixing said high rigidity encircling member (14).

4. Device according to claim 3, characterized in that said high rigidity encircling member (14) is secured to a peripheral coating mass (17) molded over said flange (18) of the upper cup (2).

5. Device according to claim 1, characterized in that said two axial abutment surfaces (20, 22) of said high rigidity encircling member (14) are carried by two raised projections (19) of low angular amplitude and opposed diametrically in a transverse plane, said two raised projections (19) projecting axially on each side of the remaining portion of said encircling member (14).

* * * * *